United States Patent
Fujino et al.

(10) Patent No.: US 9,310,848 B2
(45) Date of Patent: Apr. 12, 2016

(54) ELECTRONIC APPARATUS WITH A TORQUE VARIABLE STRUCTURE CONNECTING HOUSING COMPONENTS

(71) Applicant: Lenovo (Singapore) Pte. Ltd., Singapore (SG)

(72) Inventors: Takane Fujino, Kanagawa-ken (JP); Eiji Shinohara, Kanagawa-ken (JP); Hiroyuki Noguchi, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 109 days.

(21) Appl. No.: 14/174,569

(22) Filed: Feb. 6, 2014

(65) Prior Publication Data

US 2014/0218855 A1    Aug. 7, 2014

(30) Foreign Application Priority Data

Feb. 7, 2013  (JP) ................................. 2013-021993

(51) Int. Cl.
*G06F 1/16*    (2006.01)

(52) U.S. Cl.
CPC ............ *G06F 1/1681* (2013.01); *G06F 1/1654* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,193,069 A * | 3/1993 | Furuya | ..................... | 361/679.09 |
| 5,796,576 A * | 8/1998 | Kim | ......................... | 361/679.28 |
| 6,437,973 B1 * | 8/2002 | Helot et al. | .............. | 361/679.29 |
| 6,882,529 B2 * | 4/2005 | Helot et al. | .............. | 361/679.27 |
| 7,566,033 B2 * | 7/2009 | Schwager et al. | ......... | 248/125.9 |
| 7,599,178 B2 * | 10/2009 | Huang et al. | ............. | 361/679.43 |
| 7,787,242 B2 * | 8/2010 | Schwager et al. | ....... | 361/679.28 |
| 8,199,476 B2 * | 6/2012 | Tian et al. | ................ | 361/679.29 |
| 8,797,765 B2 * | 8/2014 | Lin et al. | ....................... | 361/807 |
| 8,995,116 B2 * | 3/2015 | Hung et al. | ............. | 361/679.26 |
| 9,036,340 B1 * | 5/2015 | Colby et al. | ............. | 361/679.29 |
| 9,042,087 B2 * | 5/2015 | Hung et al. | ............. | 361/679.26 |
| 2004/0160734 A1 * | 8/2004 | Yim | .............................. | 361/681 |
| 2006/0067036 A1 * | 3/2006 | Lin et al. | ....................... | 361/681 |
| 2006/0256516 A1 * | 11/2006 | Cho | ................................ | 361/683 |
| 2007/0076363 A1 * | 4/2007 | Liang et al. | .................... | 361/683 |
| 2007/0091552 A1 * | 4/2007 | Liang et al. | .................... | 361/681 |
| 2009/0141439 A1 | 6/2009 | Moser | | |
| 2010/0238620 A1 * | 9/2010 | Fish | ......................... | 361/679.09 |
| 2012/0005860 A1 * | 1/2012 | Chen | .............................. | 16/305 |
| 2013/0170126 A1 * | 7/2013 | Lee | ......................... | 361/679.17 |
| 2014/0007380 A1 * | 1/2014 | Shih et al. | ....................... | 16/341 |
| 2014/0078654 A1 * | 3/2014 | Uchiyama et al. | ....... | 361/679.01 |

(Continued)

FOREIGN PATENT DOCUMENTS

| | | |
|---|---|---|
| JP | H07072961 A | 3/1995 |
| JP | 2006105392 A | 4/2006 |

*Primary Examiner* — Lisa Lea Edmonds
(74) *Attorney, Agent, or Firm* — Ference & Associates LLC

(57) ABSTRACT

In an embodiment there is provided an electronic apparatus in which two housings are detachable and rotatable, and in which when one housing is detached from the other housing, and having a bracket for attachment and detachment that is easily rotated. An electronic apparatus may include an upper housing having a display; a lower housing which is rotatably connected with a bracket from which the upper housing is detachable by hinges; and a torque variable structure which changes rotational torque of the bracket at the hinges. The torque variable structure is capable of reducing the rotational torque of the bracket at the hinges in a state in which the upper housing is detached from the bracket, rather than a state in which the upper housing is mounted on the bracket.

15 Claims, 10 Drawing Sheets

(56) References Cited

U.S. PATENT DOCUMENTS

2014/0133079 A1* 5/2014 Noguchi et al. ......... 361/679.09
2014/0285960 A1* 9/2014 Sharma et al. ........... 361/679.28
2015/0185783 A1* 7/2015 Hui et al. ................. 361/679.29

* cited by examiner

ELECTRONIC APPARATUS WITH A TORQUE VARIABLE STRUCTURE CONNECTING HOUSING COMPONENTS

CLAIM FOR PRIORITY

This application claims priority to Japanese Patent Application Serial No. 2013-021993, filed Feb. 7, 2013, the contents of which are incorporated by reference herein.

FIELD

The present invention relates to an electronic apparatus in which a first housing having a display is detachable from and openable or closable with respect to a second housing.

BACKGROUND

Recently, a tablet personal computer (tablet PC) which has a touch panel liquid crystal display and does not have a physical keyboard has rapidly become widespread. The tablet PC is easily carried and operation is easy since an input work can be performed through the touch panel.

However, since the tablet PC does not have a physical keyboard, for example, trouble occurs in an input work for inputting a long sentence in some cases. For example, there has been proposed a computer having a configuration in which a tablet PC that is an upper housing is detachable from a lower housing having a keyboard in Japanese Patent Application Laid-Open No. 2005-158013. Since such a computer can be used in two ways, as a laptop PC and as a tablet PC, it is very convenient for a user to use the computer.

SUMMARY

In summary, one aspect provides an electronic apparatus, comprising: a first housing having a display; a second housing rotatably connected with a bracket from which the first housing is detachable; and a torque variable structure which changes rotational torque of the bracket at the hinge if the first housing is attached to the second housing.

Another aspect provides an electronic apparatus, comprising: a first housing having a display; a second housing which is rotatably connected with a bracket from which the first housing is detachable by a hinge; and a torque variable structure which changes rotational torque of the bracket at the hinge, wherein the first housing is openable and closable with respect to the second housing by rotating the bracket on which the first housing is mounted, and the torque variable structure has a torque change inhibiting mechanism which inhibits the rotational torque from being changed in a state in which the first housing is mounted on the bracket.

Further aspects are described herein and reference is made to the following detailed description for particular example embodiments.

The foregoing is therefore a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims

BRIEF DESCRIPTION OF THE DRAWINGS

FIG. 8A is a diagram illustrating a state in which the bracket is set to an initial position and the shaft side engaging portion and the bracket side engaging portion are engaged with each other.

FIG. 8B is a diagram illustrating a state in which the bracket is changed to a slide position from the state illustrated in FIG. 8A and the bracket side engaging portion is separated from the shaft side engaging portion.

FIG. 8C a diagram illustrating a state in which the bracket is rotated and pushed forward from the state illustrated in FIG. 8B.

FIG. 9A is a diagram illustrating a state in which the upper housing is not mounted.

FIG. 9B is a diagram illustrating a state in which the upper housing is mounted.

DETAILED DESCRIPTION

Figure 1:
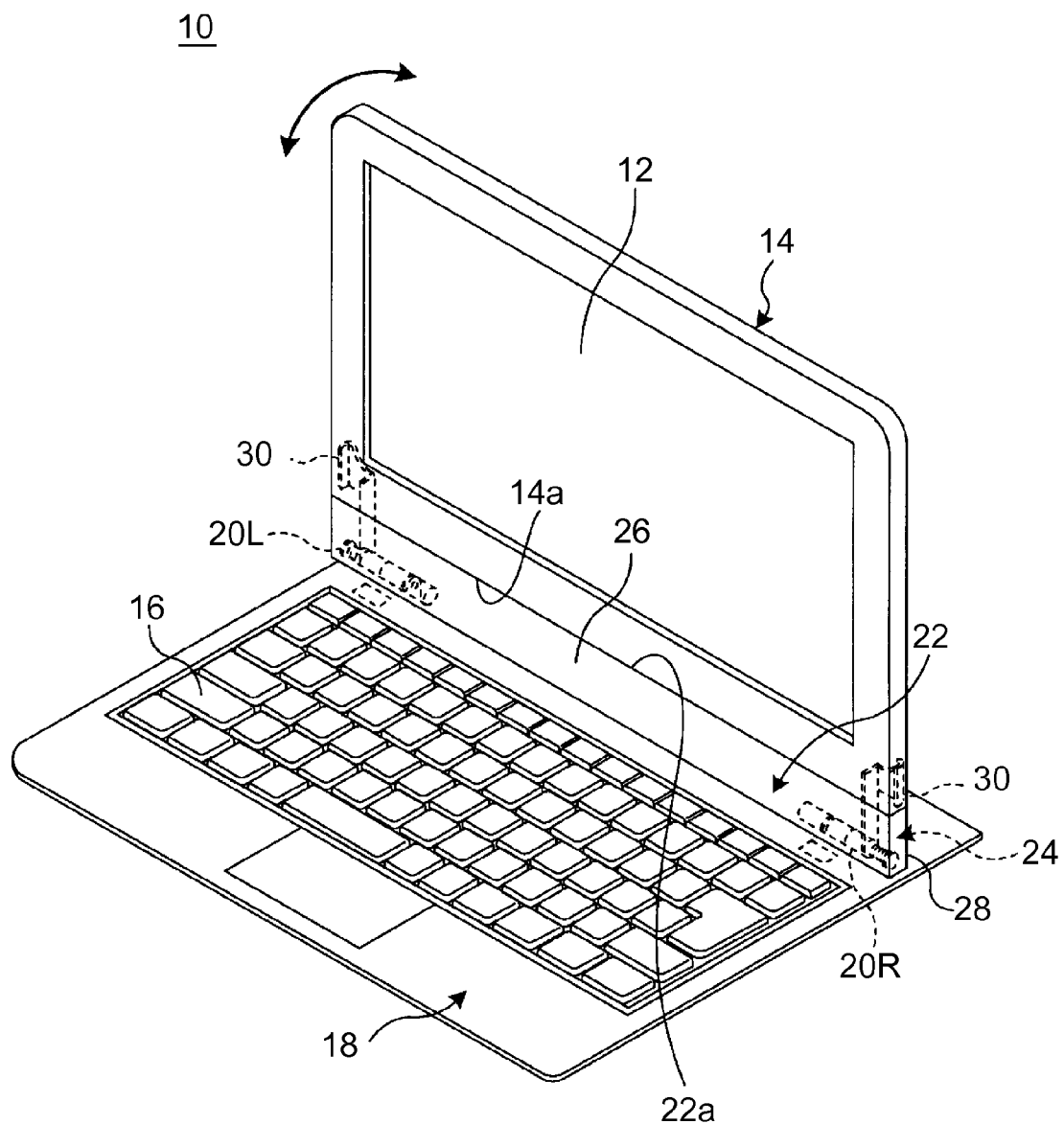
FIG. 1 is a perspective view illustrating an electronic apparatus according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In the configuration in Japanese Patent Application Laid-Open No. 2005-158013, the computer includes a bracket which is rotatably connected with the lower housing having a keyboard by a hinge, and the upper housing having a display is detachable from the bracket. Therefore, the bracket protruding from the upper surface of the housing is an obstacle in a case where only the lower housing is carried or attempted to be stored in a bag in a state in which the upper housing is detached from the bracket. Here, when the bracket is rotated by the hinge and pushed down, the lower housing can have a compact shape and convenience is enhanced.

However, considering a usage form as a laptop PC, it is necessary to set torque with a degree of stably holding the upper housing mounted on the bracket at a predetermined angular position, at the hinge rotatably supporting the bracket to or from which the upper housing is attached or detached in the apparatus in which the tablet PC is detachable. Therefore, even when the bracket is attempted to be rotated in a state in which the upper housing is detached, less moment force by the weight and great height of the upper housing is applied than in a case in which the upper housing is mounted. Therefore, the bracket is not easily rotated by a human hand against the rotational torque set to the hinge.

On the other hand, when the rotational torque of the hinge is set to be low in advance, the bracket can be easily rotated alone. However, when the upper housing is mounted, the torque is too low and thus, it is not easy to stably hold the upper housing at a predetermined angular position.

The present invention has been made in view of the above problems of the related art, and an object thereof is to provide an electronic apparatus in which two housings are detachable and rotatable, and in which when one housing is detached from the other housing, a bracket for attachment and detachment thereof is easily rotated and the other housing can have a compact shape.

An electronic apparatus according to an embodiment includes: a first housing having a display; a second housing which is rotatably connected with a bracket from which the first housing is detachable by a hinge; and a torque variable structure which changes rotational torque of the bracket at the hinge, in which the first housing is openable and closable with respect to the second housing by rotating the bracket on which the first housing is mounted, and the torque variable structure is capable of reducing the rotational torque of the bracket at the hinge in a state in which the first housing is detached from the bracket, rather than a state in which the first housing is mounted on the bracket.

In a configuration, since the torque variable structure that is capable of reducing the rotational torque of the bracket at the hinge in a state in which the first housing is detached from the bracket, rather than a state in which the first housing is mounted on the bracket is provided, the bracket from which the first housing is detached is easily rotated by reducing the rotational torque in the state in which the first housing is detached from the second housing and the shape of the second housing can have a compact shape so as to be easily carried and stored. In addition, since a large rotational torque can be set in the state in which the first housing is mounted on the second housing, the first housing can be stably held at a predetermined angular position.

When the torque variable structure has a torque reduction inhibiting mechanism which inhibits the rotational torque from being reduced in a state in which the first housing is mounted on the bracket, the rotational torque of the hinge is reduced in the state in which the first housing is mounted on the bracket, and thus, the first housing can be prevented from being unstable.

When the torque variable structure has a housing mounting inhibiting mechanism which inhibits the first housing from being mounted on the bracket in a state in which the first housing is detached from the bracket and the rotational torque is reduced, the first housing can be prevented from being mounted on the bracket in the state in which the rotational torque of the hinge is reduced.

When the torque variable structure has a hinge shaft which is supported on the hinge with a predetermined rotational torque, and a clutch mechanism which switches whether or not a rotating force is transmitted from the bracket to the hinge shaft, the rotational torque of the bracket can be easily changed just by operating the clutch mechanism.

When the bracket is slidable in a shaft direction of the hinge shaft, and the clutch mechanism has a shaft side engaging portion which is fixed not to be rotatable around the hinge shaft, and a bracket side engaging portion which is slid together with the bracket to be engageable with or disengageable from the shaft side engaging portion, the clutch mechanism is switched just by sliding the bracket, and the torque variable structure can be operated.

When the electronic apparatus further includes an elastic member that biases the bracket in a direction in which the bracket side engaging portion is engaged with the shaft side engaging portion, an engaging operation of the bracket side engaging portion and the shaft side engaging portion can be easily performed.

An electronic apparatus according to another embodiment includes: a first housing having a display; a second housing which is rotatably connected with a bracket from which the first housing is detachable by a hinge; and a torque variable structure which changes rotational torque of the bracket at the hinge, in which the first housing is openable and closable with respect to the second housing by rotating the bracket on which the first housing is mounted, and the torque variable structure has a torque change inhibiting mechanism which inhibits the rotational torque from being changed in a state in which the first housing is mounted on the bracket.

In the configuration, since the torque change inhibiting mechanism which inhibits the rotational torque at the hinge from being changed in the state in which the first housing is mounted on the bracket, the first housing is detachable from the second housing, and further, even when the rotational torque at the hinge is changeable, the rotational torque of the hinge can be prevented from being changed in a state in which the first housing is mounted on the bracket, and the first housing can be stably held with respect to the second housing at all times. In addition, the bracket can be easily rotated by changing the rotational torque at the hinge in a state in which the first housing is detached.

In a case where the first housing is detached from the bracket, when the torque change inhibiting mechanism releases the change inhibition of the rotational torque, in the state in which the first housing is detached from the bracket, it is possible to change the rotational torque of the bracket. Thus, for example, the bracket from which the first housing is detached is easily rotated, and the shape of the second housing can be changed into a compact shape.

That is, it is preferable that the torque variable structure be capable of reducing the rotational torque in a state in which the first housing is detached from the bracket, rather than a state in which the first housing is mounted on the bracket.

When the torque variable structure has a hinge shaft which is supported on the hinge with a predetermined rotational torque, and a clutch mechanism which switches whether or not a rotating force is transmitted from the bracket to the hinge shaft, the rotational torque of the bracket can be easily changed just by operating the clutch mechanism.

The bracket may be slidable in a shaft direction of the hinge shaft, the clutch mechanism may have a shaft side engaging portion which is fixed not to be rotatable around the hinge shaft, and a bracket side engaging portion which is slid together with the bracket to be engageable with or disengageable from the shaft side engaging portion, and the torque change inhibiting mechanism may have a stopper member which prevents the bracket from sliding in a state in which the first housing is mounted on the bracket while allowing the bracket to be slid in a state in which the first housing is detached from the bracket. Then, the clutch mechanism is switched just by sliding the bracket, and the torque variable structure can be operated. Further, since the sliding of the bracket is prevented by the stopper member in a state in which the first housing is mounted on the bracket, the rotational torque of the hinge is released in the state in which the first housing is mounted on the bracket, and thus, the first housing can be prevented from being unstable.

In a state in which the first housing is detached from the bracket, and the bracket is slid to a position where the shaft side engaging portion and the bracket side engaging portion are disengaged from each other, when the stopper member prevents the first housing from being mounted on the bracket, for example, in a state in which the rotational torque of the hinge is reduced by the torque variable structure, it is possible to prevent the first housing from being mounted on the bracket.

When the second housing has a keyboard, and the first housing is a tablet personal computer operable in a state in which the first housing is separated from the second housing, for example, the weight of the first housing is larger than the weight of a display unit of a regular laptop PC. Therefore, it is necessary that a larger rotational torque be set to the hinge to stably hold the first housing at a predetermined angular position. As a result, it is more difficult to rotate the bracket in a state in which the first housing is detached. In the electronic apparatus, since the torque variable structure is provided, the bracket can be easily rotated alone.

According to an embodiment, the bracket from which the first housing is detached is easily rotated by reducing rotational torque in a state in which the first housing is detached from the second housing and the shape of the second housing can be changed into a compact shape so as to be easily stored and carried. In addition, the rotational torque can be set to be large in a state in which the first housing is mounted on the second housing, the first housing can be stably held at a predetermined angular position.

Hereinafter, an electronic apparatus according to an embodiment will be described in detail with reference to the accompanying drawings using a preferred embodiment.

Figure 2:
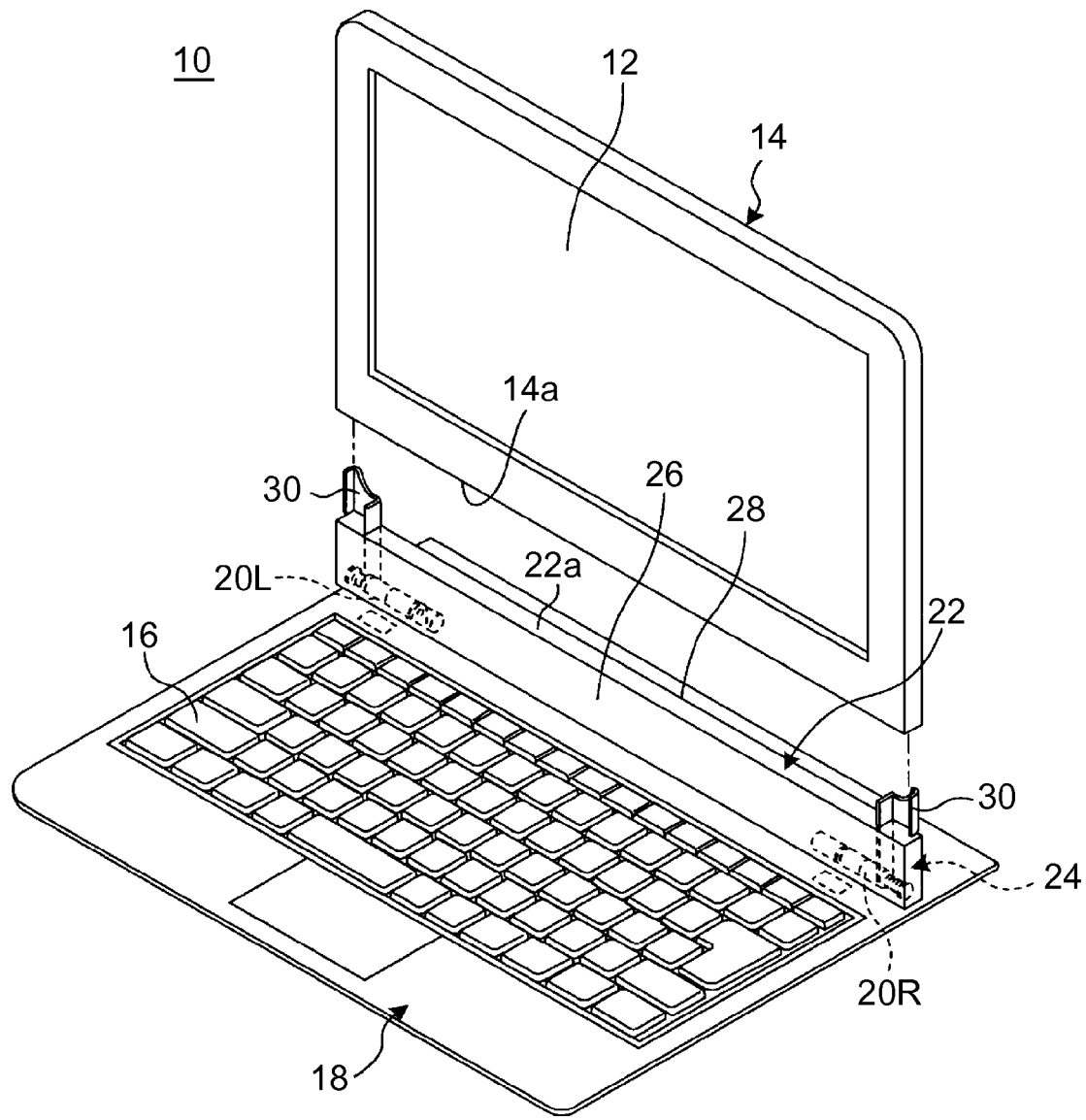
FIG. 2 is a perspective view illustrating a state in which an upper housing is detached from a lower housing in the electronic apparatus illustrated in FIG. 1.

FIG. 1 is a perspective view illustrating an electronic apparatus 10 according to an embodiment, and illustrates a state in which an upper housing 14 having a display 12 is mounted on a lower housing 18 in which a keyboard 16 is provided. FIG. 2 is a perspective view illustrating a state in which the upper housing 14 is detached from the lower housing 18 in the electronic apparatus 10 illustrated in FIG. 1.

The electronic apparatus 10 according to the embodiment is a laptop and tablet hybrid PC which functions as a laptop PC in a state in which the upper housing 14 is mounted on the lower housing 18, and the upper housing 14 alone functions as a tablet PC in a state in which the upper housing 14 is separated from the lower housing 18. Other than such a hybrid PC, an embodiment is applicable to a mobile phone, a smart phone, an electronic notebook and the like, as long as an electronic apparatus has two separable housings. As illustrated in FIG. 1, vertical, horizontal and depth (front and back) directions are defined from a direction seen from a user operating the keyboard 16 while visually checking the display 12 by erecting the upper housing 14 with respect to the lower housing 18 at almost right angles, and a description is made below.

As illustrated in FIGS. 1 and 2, the electronic apparatus 10 includes the upper housing (first housing) 14 having the display 12, and the lower housing (second housing) 18 having the keyboard 16. The upper housing 14 is detachable from a bracket 22 which is rotatably connected with the lower housing 18 by a pair of left and right side hinges 20L and 20R (hereinafter, also collectively referred to as "hinge 20"). The upper housing 14 which is mounted on the bracket 22 is rotated by the hinge 20 and therefore, the upper housing functions as a lid which is openable and closeable with respect to an upper surface (a surface on the side of the keyboard 16) of the lower housing 18 and functions in the same manner as a display unit which opens and closes in a regular laptop PC.

The upper housing 14 has the display 12, for example, formed of a touch panel liquid crystal display unit, and houses various kinds of electronic components (not illustrated) such as a substrate, an operating unit and a memory, which configures a tablet PC. The upper housing 14 is detachable from the bracket 22 by an attaching and detaching mechanism (not illustrated) such as a hook or a recessed portion for a hook engagement which is provided on an attaching and detaching surface 14a which is a lower end surface in FIG. 2, and an attached and detached surface 22a which is an upper end surface of the bracket 22. In addition, the upper housing 14 is electrically connected with the lower housing 18 in such a manner that a connector (not illustrated) provided on the attaching and detaching surface 14a is connected with a terminal block (not illustrated) provided on the attached and detached surface 22a of the bracket 22. The upper housing 14 may have the same configuration as a regular tablet PC as well as the attaching and detaching mechanism with the lower housing 18, a control function and the like.

The lower housing 18 is an extension device for the upper housing 14 that includes the physical keyboard 16 which functions as external input means of the upper housing 14, and causes the upper housing 14 which is a tablet PC to function as a laptop PC to enhance the convenience thereof. One end of the hinge 20 is fixed to the lower housing 18 and the lower housing rotatably supports the bracket 22 to which the other end of the hinge 20 is fixed. It is needless to say that the lower housing 18 may be provided with electronic components other than the keyboard 16, for example, extension devices such as a magnetic disk unit and an optical disk unit.

Figure 3:
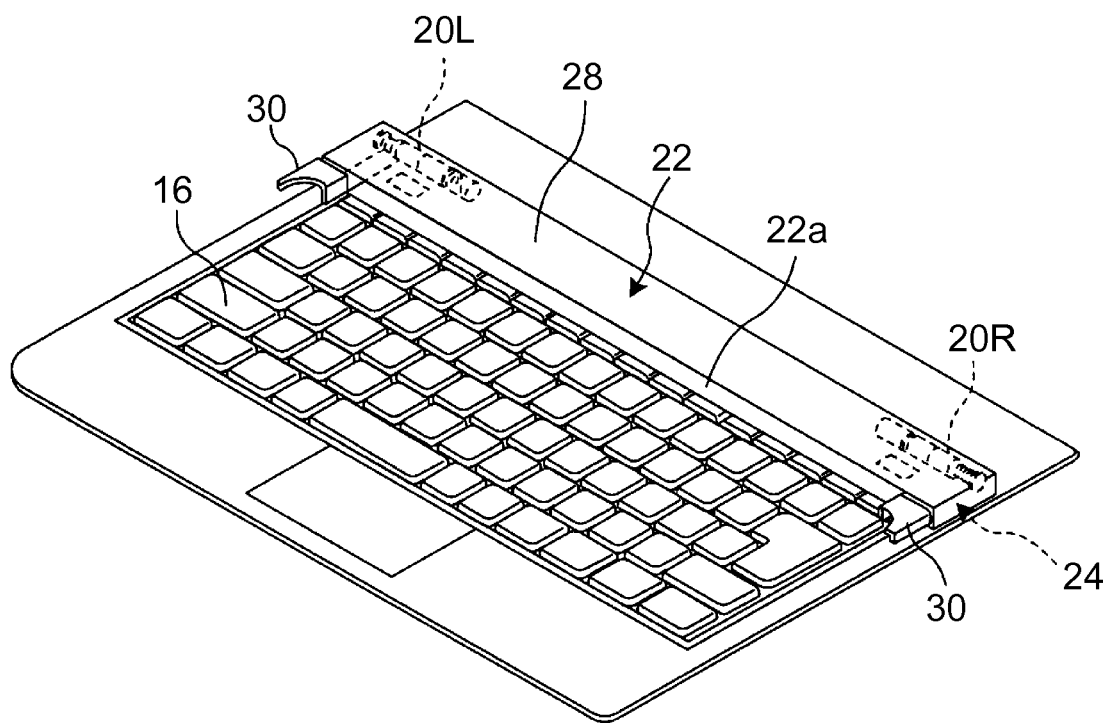
FIG. 3 is a perspective view illustrating a state in which a bracket from which the upper housing is detached is pushed down.

However, as illustrated in FIG. 2, when the upper housing 14 is detached from the bracket 22 in a state in which the upper housing 14 is erected, the bracket 22 is in a standing state from an upper surface of the lower housing 18. Therefore, when the lower housing 18 alone is stored in a bag, it is preferred that the lower housing is changed into a compact storage posture as illustrated in FIG. 3 by rotating and pushing the bracket 22 forward by the hinge 20.

However, it is necessary for the hinge 20 to stably hold the bracket 22 in a state in which the upper housing 14 is mounted at a predetermined angular position (for example, about 10° to 170° when a full close position of the upper housing 14 is set to 0°) as illustrated in FIG. 1, and a sufficiently large rotational torque which is suitable for holding the bracket is set. Therefore, even when the bracket 22 is rotated in a state in which the upper housing 14 is detached, the weight and height of the upper housing are more significantly reduced than in a case where the upper housing 14 is mounted. Thus, it is very difficult to rotate the bracket 22 by a human hand against the rotational torque set to the hinge 20.

Particularly, the electronic apparatus 10 according to the embodiment is different from a regular laptop PC and the upper housing 14 functions as a tablet PC. Therefore, a large number of electronic components such as a substrate, an operating unit and a memory as described above are mounted in the upper housing 14, and the upper housing tends to have more weight than the weight of a display unit of a regular laptop PC and necessarily, the rotational torque which is set to the hinge 20 is set to be large. As a result, it is more difficult to rotate the bracket 22 by a human hand in a state in which the upper housing 14 is detached in the electronic apparatus 10 than in a case of a regular laptop PC.

In order to solve such a problem, when the upper housing 14 is detached, a structure (torque variable structure 24) in which the torque at the hinge 20 is reduced (released) to easily rotate the bracket 22 is mounted in the electronic apparatus 10 according to the embodiment. In other words, the electronic apparatus 10 is provided with the torque variable structure 24 and thus, in the electronic apparatus 10, the torque at the hinge 20 can be maintained at the set torque in a state in which the upper housing 14 is mounted on the bracket 22, and the unstable angular position of the upper housing 14 can be avoided.

Next, the configurations of the hinge 20 and the bracket 22 and the configuration of the torque variable structure 24 provided therebetween will be described.

Figure 4:
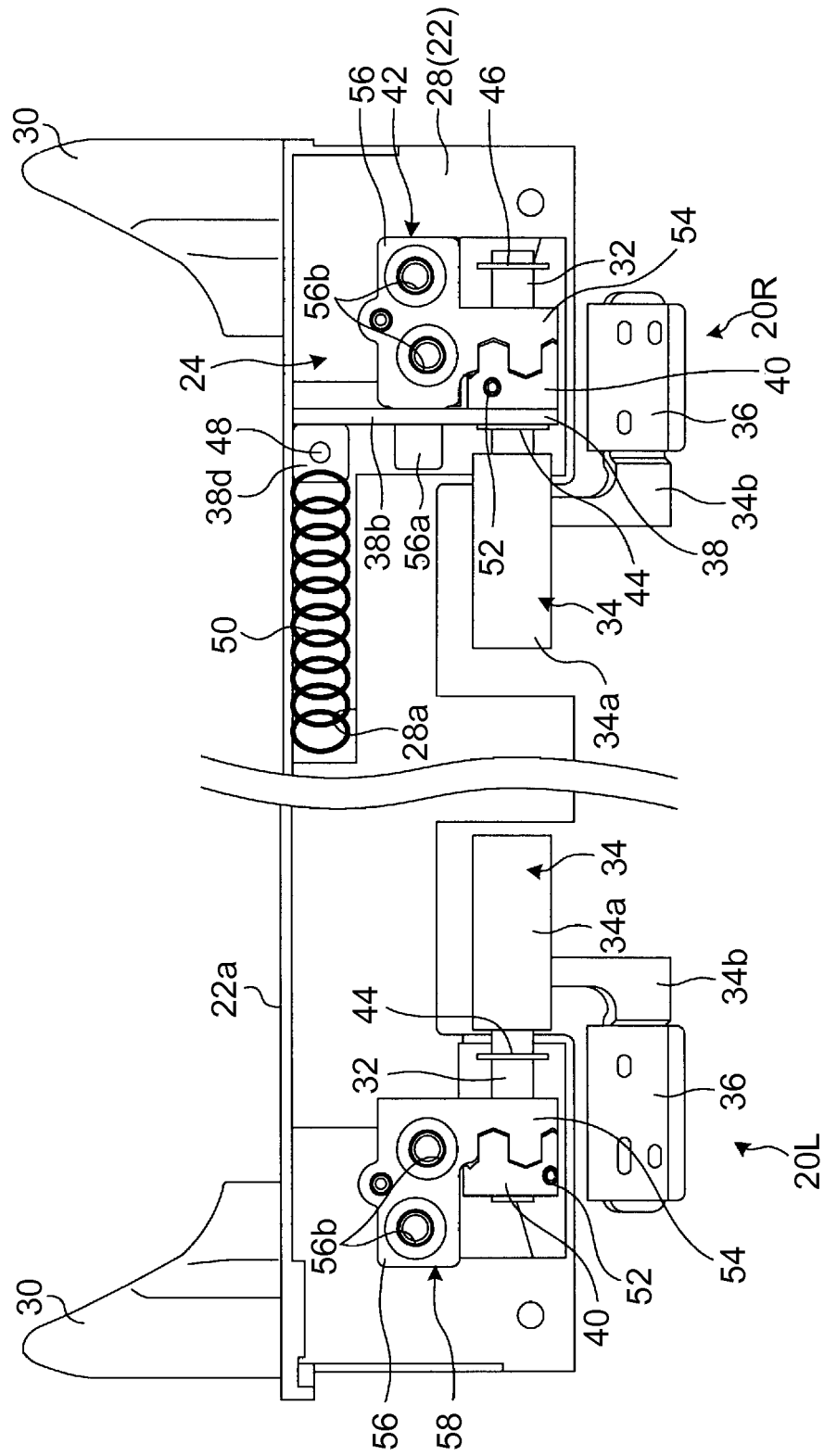
FIG. 4 is a front view in which some parts of a hinge and the bracket are omitted.
Figure 5:
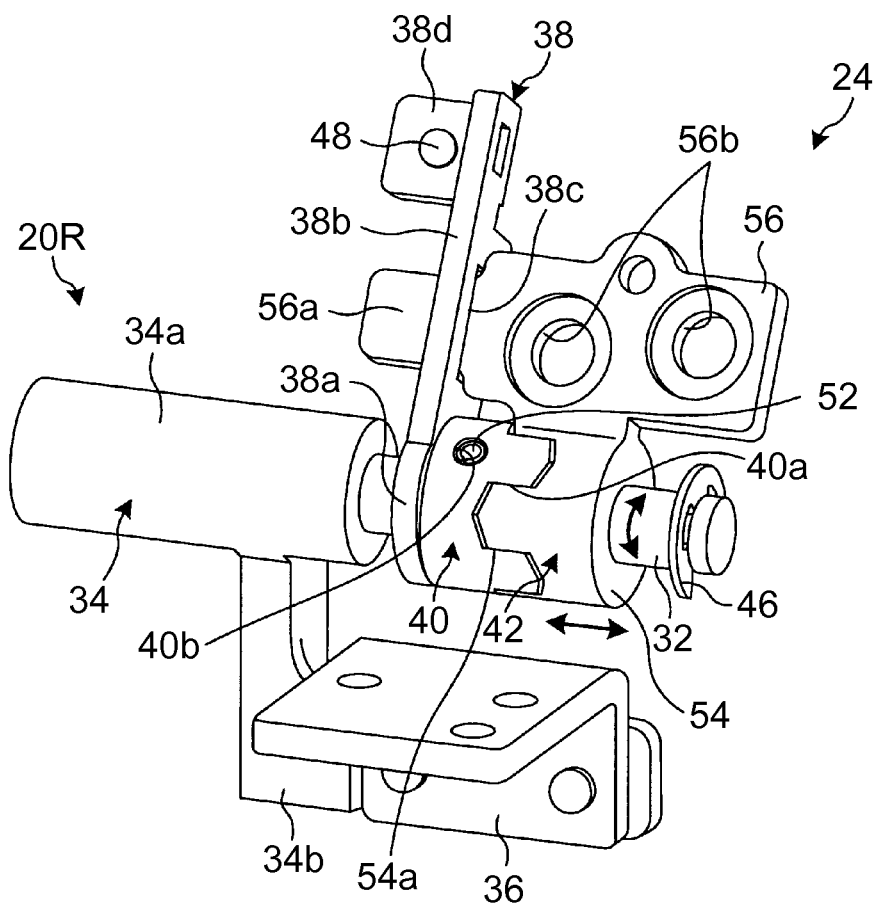
FIG. 5 is a perspective view illustrating a right side hinge and the peripheral part thereof.
Figure 6:
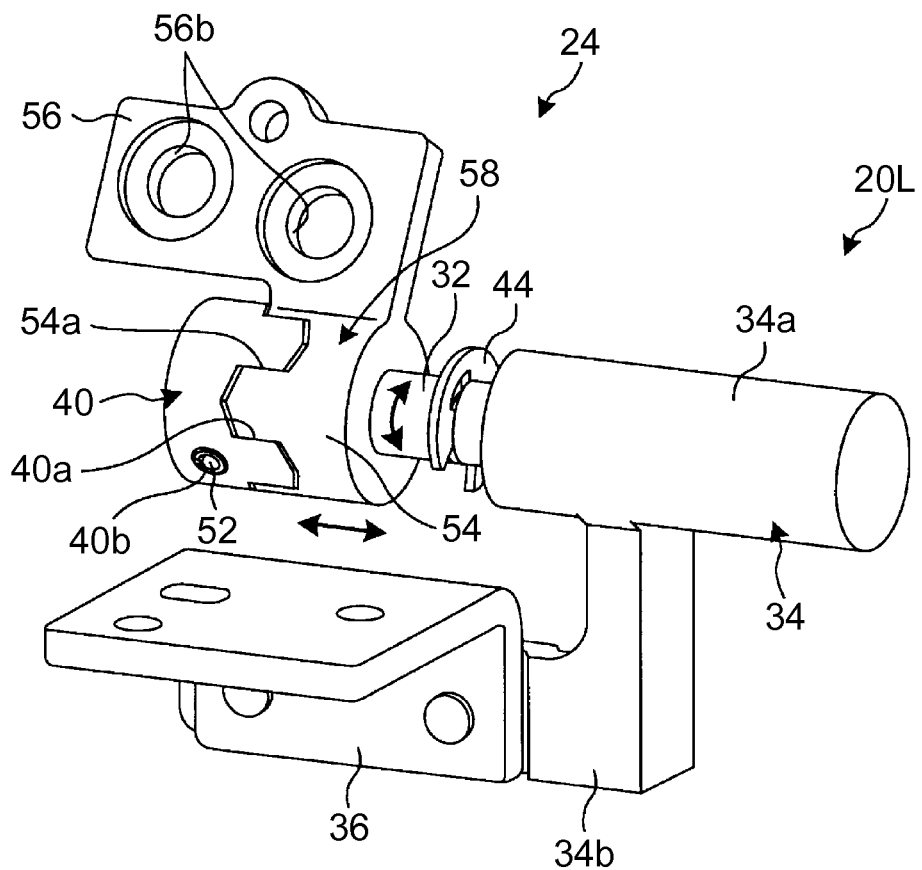
FIG. 6 is perspective view illustrating a left side hinge and the peripheral part thereof.

FIG. 4 is a front view in which some parts of the hinge 20 and the bracket 22 are omitted. In FIG. 4, a cover plate 26 that covers a front surface of the bracket 22 which has an erected posture as illustrated in FIG. 1 is omitted and the periphery of the left and right side hinges 20L and 20R is enlarged. FIG. 5 is a perspective view illustrating the right side hinge 20R and the peripheral part thereof, and FIG. 6 is a perspective view illustrating the left side hinge 20L and the peripheral part thereof.

Next, the bracket 22 will be described.

As illustrated in FIGS. 2 to 4, the bracket 22 has the substantially same thickness as the thickness of the first housing 14, and is a strip-shaped member that has almost the same width as the width of the first housing 14 and the second housing 18. The bracket 22 has a base plate 28 which is connected with the hinge 20, and the cover plate 26 which covers the front surface of the base plate 28, and some components of the hinge 20 are housed in a space formed into a flat box by the base plate 28 and the cover plate 26.

On the attached and detached surface 22a which is the upper end surface of the bracket 22, the above-described terminal block and attaching and detaching mechanism is provided. At the left and right upper ends of the attached and detached surface 22a in a width direction, supporting arms 30 that protrude upward and are inserted into attachment holes on the side of the first housing 14 to supports the first housing 14 are provided (refer to FIG. 1). The supporting arm 30 is a protrusion having a tapered right-angled triangular shape of which the width of one side is gradually reduced upward.

Next, the right side hinge 20R will be described.

As illustrated in FIGS. 4 and 5, the hinge 20R has a hinge main body 34 which supports a hinge shaft 32 with a predetermined rotational torque, and a lower attaching member 36 which has an L-shaped cross-sectional surface to fix the hinge main body 34 to the second housing 18.

The hinge main body 34 has a cylindrical portion 34a having a shaft hole supporting the hinge shaft 32 with a predetermined rotational torque, and an attaching arm 34b which protrudes once downward from a lower surface of the cylindrical portion 34a and then, extends outward (rightward) in parallel with the hinge shaft 32 to fix a vertical surface of the lower attaching member 36 to the tip end.

The hinge shaft 32 is inserted into a link arm 38, a fixed housing 40 and an upper attaching member 42 sequentially from the base end side (cylindrical portion 34a side) to the tip end side (right side), an inner E ring 44 is fitted to the base end side of the link arm 38, and an outer E ring 46 is fitted to the tip end side of the upper attaching member 42.

The link arm 38 includes a shaft hole portion 38a at the lower end in which a shaft hole into which the hinge shaft 32 is inserted in a freely rotatable state is formed, a rotary arm 38b which extends upward along the inner surface of the base plate 28 from the shaft hole portion 38a, a long hole 38c which extends in a longitudinal direction in the periphery of the center of the rotary arm 38b, and a protrusion piece 38d which protrudes inward (leftward) from the tip end of the rotary arm 38b. The shaft hole portion 38a is formed in a disk shape and the shaft hole (not illustrated) into which the hinge shaft 32 is freely rotatably inserted is formed in the center portion of the shaft hole portion. A thin plate-like slide piece 56a of the upper attaching member 42 is slidably inserted into the long hole 38c. In the center portion of the protrusion piece 38d, a hole portion is formed and the protrusion piece 38d supports an end of a coil spring (elastic member) 50 with a pin 48 fitted into the hole portion.

The link arm 38 is supported to be freely rotatable around the hinge shaft 32 while the left and right side surfaces of the shaft hole portion 38a are respectively held between the inner E ring 44 and the fixed housing 40 and the movement of the link arm in a shaft direction of the hinge shaft 32 is regulated.

The fixed housing 40 is rotated integrally with the hinge shaft 32, and at the tip end (right side), a shaft side engaging portion 40a in the form of a face gear in which concave and convex shapes are evenly formed at equal angles along a circumferential direction is formed. In the embodiment, a configuration in which five concave and convex portions are evenly formed in the circumferential direction is illustrated as the shaft side engaging portion 40a. On the base end side (left side) of the circumference of the fixed housing 40, a locking screw 52 is fastened to a screw hole 40b passing through the fixed housing in a diameter direction. The tip end of the locking screw 52 is press-contacted with the outer circumference of the hinge shaft 32 and thus, the fixed housing 40 is fixed not to be rotatable around the hinge shaft 32.

The upper attaching member 42 is a member for fixing the bracket 22 to the hinge 20R, and is rotatable around the hinge shaft 32 integrally with the bracket 22. The upper attaching member 42 includes a movable housing 54 into which the hinge shaft 32 is inserted, and an attachment plate 56 which is provided at the upper outer circumference of the movable housing 54 in a protruding manner and has the slide piece 56a protruding from one end of the attachment plate. The movable housing 54 is substantially symmetrical to the fixed housing 40 and a bracket side engaging portion 54a in the form of a face gear which can be coaxially engaged with the shaft side engaging portion 40a of the fixed housing 40 is formed on the base end side (left side). Since the bracket side engaging portion 54a can be engaged with the shaft side engaging portion 40a, a structure in which five concave and convex portions are evenly formed in the circumferential direction is illustrated in the embodiment. On the attachment plate 56, a pair of attachment holes 56b and 56b is formed. A bolt (not illustrated) which is inserted into each attachment hole 56b is screwed to a screw hole (not illustrated) which is formed on the inner surface of the base plate 28, and thus, the upper attaching member 42 and the bracket 22 are integrally fastened and fixed. The slide piece 56a protrudes from one end surface (left end surface) of the attachment plate 56 and is slidably inserted into the long hole 38c of the rotary arm 38b.

In a state in which the shaft side engaging portion 40a and the bracket side engaging portion 54a are engaged with each other (refer to FIGS. 4 and 5), a predetermined distance is formed between one end surface (right end surface) of the movable housing 54 and the outer E ring 46, and the movable housing 54 is allowed to be slid in the shaft direction of the hinge shaft 32 by the amount of the distance. That is, the upper attaching member 42 can slide in the shaft direction of the hinge shaft 32 from a position in which the bracket side engaging portion 54a is completely engaged with the shaft side engaging portion 40a (refer to FIGS. 4 and 5) to a position in which one end of the movable housing 54 abuts on the outer E ring 46 (refer to FIG. 7). In the position in which the movable housing 54 abuts on the outer E ring 46, the bracket side engaging portion 54a is completely separated from the shaft side engaging portion 40a and both are in a disengaged state. In this manner, a slide range (the predetermined distance) of the movable housing 54 is set to a range in which at least the shaft side engaging portion 40a and the bracket side engaging portion 54a can be engaged with or disengaged from each other.

Figure 7:
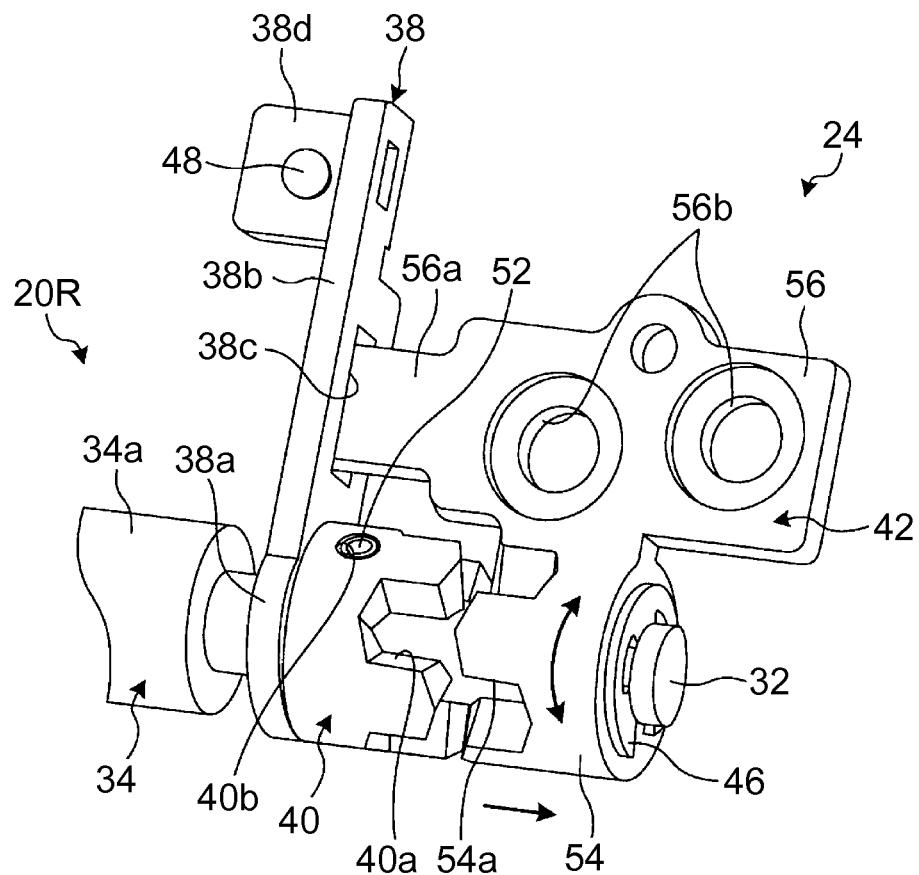
FIG. 7 is a perspective view illustrating a state in which an upper attaching member of the right side hinge is slid to separate a bracket side engaging portion from a shaft side engaging portion.

In addition, as clearly seen from FIGS. 5 and 7, the slide piece 56a is usually in a position in which the slide piece is inserted into the long hole 38c of the rotary arm 38b within the movable range of the movable housing 54 (upper attaching member 42). Therefore, the rotary arm 38b is rotated around the hinge shaft 32 by the slide piece 56a usually integrally with the upper attaching member 42 (bracket 22) due to a pressing action in a rotational direction using the hinge shaft 32 as a shaft center.

Next, the left side hinge 20L will be described.

Most of the left side hinge 20L is symmetrical to the right side hinge 20R. Thus, in regard to the hinge 20L, the same reference numbers are given to components that have the same or similar functions and effects as those of the hinge 20R, and the detailed description thereof will be omitted.

As illustrated in FIGS. 4 and 6, the hinge 20L includes the hinge shaft 32 and the hinge main body 34, and the lower attaching member 36. The hinge shaft 32 of the hinge 20L is inserted into an upper attaching member 58 and the fixed housing 40 sequentially from the base end side (cylindrical portion 34a side) to the tip end side (left side) and the inner E ring 44 is fitted to the base end side of the upper attaching member 58.

The upper attaching member 58 is member for fixing the bracket 22 to the hinge 20L, and is rotatable around the hinge shaft 32 integrally with the bracket 22. The upper attaching member 58 has a configuration in which the slide piece 56a is actually omitted from the upper attaching member 42 of the hinge 20R and includes the movable housing 54 into which the hinge shaft 32 is inserted, and the attachment plate 56 which is provided in the upper outer circumference of the movable housing 54 in a protruding manner. In the movable housing 54, the bracket side engaging portion 54a in the form of a face gear which can be coaxially engaged with the shaft side engaging portion 40a of the fixed housing 40 is formed. A pair of the attachment holes 56b and 56b is formed in the attachment plate 56, and the upper attaching member 58 and the bracket 22 are integrally fastened and fixed by a bolt (not illustrated) which is inserted into each attachment hole 56b.

In the hinge 20L, a slide range of the movable housing 54 (upper attaching member 58) is set to a distance between the fixed housing 40 and the inner E ring 44, and is the same as the distance between the movable housing 54 and the outer E ring 46 in the hinge 20R as described above. Accordingly, the upper attaching member 58 is slidable in the shaft direction of the hinge shaft 32 from the position in which the bracket side engaging portion 54a is completely engaged with the shaft side engaging portion 40a (refer to FIGS. 4 and 6) to the position in which one end of the movable housing 54 abuts on the inner E ring 44 (omitted in the drawing, but substantially the same as the case of the hinge 20R illustrated in FIG. 7). Also, in the hinge 20L, the bracket side engaging portion 54a is completely separated from the shaft side engaging portion 40a and both are in a disengaged state in the position in which the movable housing 54 abuts on the inner E ring 44. That is, in the hinge 20L, the slide range of the movable housing 54 is set to a range in which at least the bracket side engaging portion 54a can be engaged with or disengaged from the shaft side engaging portion 40a.

In the hinges 20L and 20R, as illustrated in FIGS. 4 to 6, in a state in which the shaft side engaging portion 40a and the bracket side engaging portion 54a are engaged with each other, the movable housing 54 (upper attaching members 42 and 58) and the link arm 38 also rotate together with the fixed housing 40 which rotates integrally with the hinge shaft 32 and the bracket 22 also rotates together with the hinge shaft 32. On the other hand, as illustrated in FIG. 7, in a state in which the shaft side engaging portion 40a and the bracket side engaging portion 54a are disengaged from each other, the movable housing 54 (upper attaching members 42 and 58) are freely rotatable around the hinge shaft 32 and the bracket 22 is also freely rotatable around the hinge shaft 32. That is, in the state illustrated in FIG. 7, for example, the movable housing 54 (upper attaching members 42 and 58) and the link arm 38 are rotatable around the outer circumference of the hinge shaft 32 which is fixed to rotate.

In this manner, the shaft side engaging portion 40a and the bracket side engaging portion 54a forms a clutch mechanism to switch whether or not a rotating force is transmitted from the bracket 22 to the hinge shaft 32. The clutch mechanism is operated by sliding the upper attaching members 42 and 58 support the bracket 22 with the attachment plate 56, that is, the bracket 22 in the shaft direction of the hinge shaft 32 within the slide range.

In addition, as illustrated in FIG. 4, the coil spring 50 is interposed between one side of the hinge 20R and the bracket 22. The coil spring 50 is arranged in a groove 28a formed on the inner surface of the base plate 28 along a horizontal longitudinal direction, one end thereof is fixed to the protrusion piece 38d of the link arm 38 that is positioned not to be slidable in the shaft direction of the hinge shaft 32 by the pin 48, and the other end is fixed to the bracket 22 which is slidable.

The coil spring 50 is a compression spring which accumulates an elastic energy sufficiently in the position in which the bracket 22 is slid to the left end to engage the shaft side engaging portions 40a and the bracket side engaging portions 54a of the left and right hinges 20L and 20R (hereinafter, refer to as an "initial position" or a "mounting position") as illustrated in FIG. 4, and in the position in which the bracket 22 is biased to the left side and the bracket 22 is slid to the right end to separate the shaft side engaging portions 40a and the bracket side engaging portions 54a of the left and right hinges 20L and 20R (hereinafter, refer to as a "slide position" or a non-mounting position") as illustrated in FIG. 7.

Next, the torque variable structure 24 which changes the rotational torque of the bracket 22 at the hinge 20 will be described together with a pushing operation of the bracket 22.

First, in a state in which the hinges 20L and 20R are in the initial position and the upper housing 14 is mounted on the bracket 22 as illustrated in FIG. 1, as illustrated in FIGS. 4 to 6 and FIG. 8A, the bracket 22 is slid to the left end, and the shaft side engaging portion 40a and the bracket side engaging portion 54a are engaged with each other. In addition, the engaged state of the shaft side engaging portion 40a and the bracket side engaging portion 54a is reliably maintained by the biasing action of the coil spring 50.

Since the shaft side engaging portion 40a and the bracket side engaging portion 54a are engaged and the clutch mechanism is connected in the above-described state, the bracket 22 rotates integrally with the hinge shaft 32, and the rotational torque of the bracket 22 becomes a large torque set to the cylindrical portion 34a of the hinge main body 34 in advance. Therefore, even in a state in which the upper housing 14 that is a heavy object is mounted, the hinge 20 can stably hold the bracket 22 at a predetermined angular position. On the other hand, when the user covers the lower housing 18 with the upper housing 14 by the moment force based on a distance from the hinge 20 to the upper end of the upper housing 14 or the weight of the upper housing 14 itself, the upper housing 14 is allowed to be smoothly rotated.

Next, when the lower housing 18 is covered by the bracket 22 as illustrated in FIG. 3 after the upper housing 14 is detached from the bracket 22 as illustrated in FIG. 2, the rotational torque of the bracket 22 may be reduced using the torque variable structure 24. When the rotational torque of the bracket 22 is reduced by the torque variable structure 24, first, the bracket 22 is grasped by a human hand and the bracket 22 is slid to the right side along the hinge shaft 32 against the biasing force of the coil spring 50 (refer to FIGS. 7 and 8B).

Since the shaft side engaging portion 40a and the bracket side engaging portion 54a are separated (disengaged) and the clutch mechanism is not connected in the above-described state, the bracket 22 is freely rotatable around the hinge shaft 32 together with the upper attaching members 42 and 58, and is not influenced by the rotational torque set to the hinge main body 34. That is, the rotational torque of the hinge main body 34 is released. Therefore, when the bracket 22 is grasped by a human hand, the bracket can be easily rotated and pushed forward (refer to FIGS. 3 and 8C).

Figure 8A:
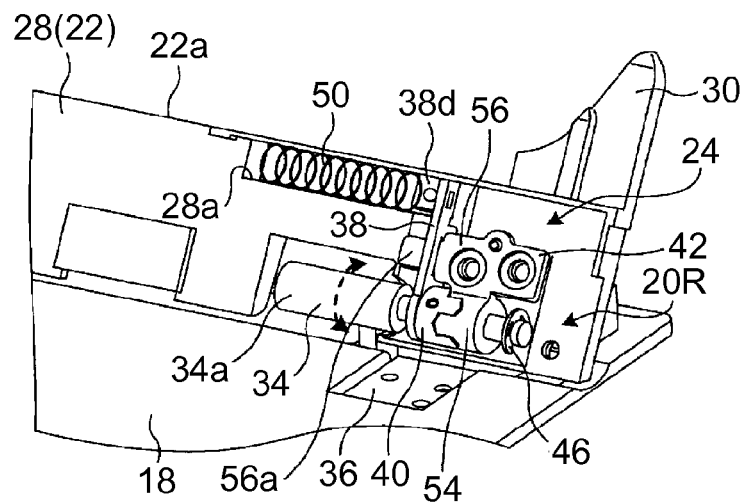
FIGS. 8A to 8C are illustration diagrams illustrating rotation operations of the bracket.
Figure 8B:
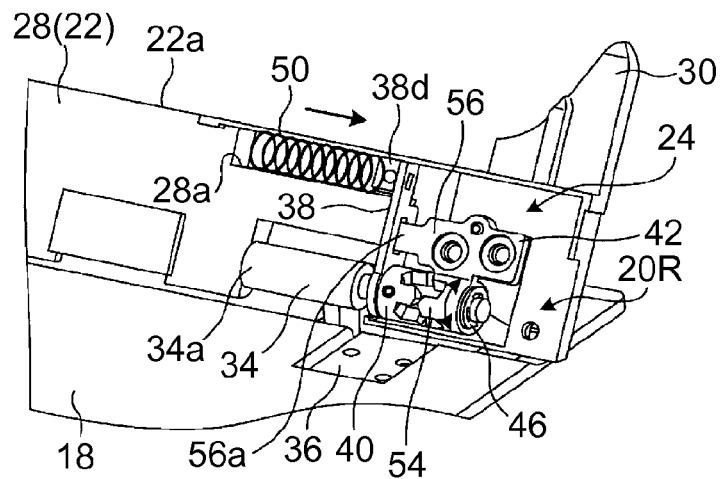
Figure 8C:
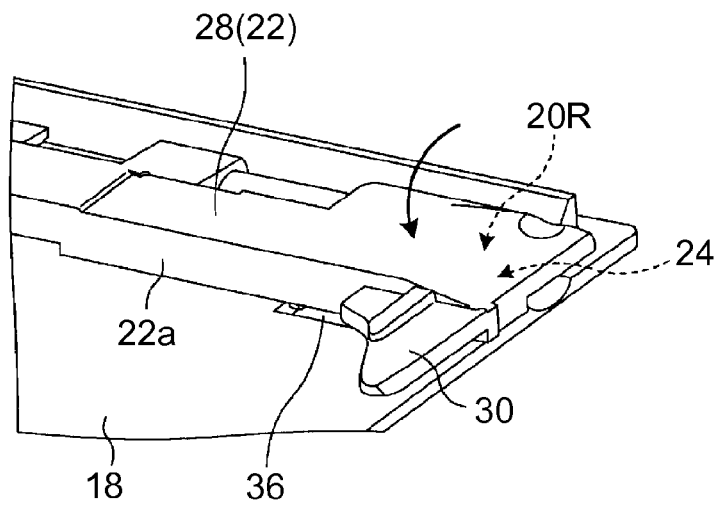

On the other hand, the above-described operations may be performed reversely to erect the bracket 22 in the state of being pushed down as illustrated in FIG. 8C as illustrated in FIG. 8A. That is, after the pushed bracket 22 (refer to FIG. 8C) is grasped by a human hand and is rotated to be erected (refer to FIG. 8B), the bracket may be slid to the left side using the biasing force of the coil spring 50 and the shaft side engaging portion 40a and the bracket side engaging portion 54a may be engaged with each other (refer to FIG. 8A).

Installation phases of the shaft side engaging portion 40a and the bracket side engaging portion 54a in the circumferential direction of the concave and convex shape, for example, may be configured to be engageable in the state of FIG. 8C in which the bracket 22 is completely closed. That is, the bracket 22 may be slid to the left side using the biasing force of the coil spring 50 in a state in which the bracket 22 is pushed down, and the shaft side engaging portion 40a and the bracket side engaging portion 54a may be engaged again to be connected with the clutch mechanism. Then, the rotational torque of the hinge main body 34 is applied to the bracket 22 in the pushed state as illustrated in FIG. 8C again, and thus, the pushed state of the bracket 22 can be stably maintained and the bracket 22 does not rattle during carrying and the like. When the bracket 22 is erected with such a configuration, the bracket 22 in the pushed state may be once slid to the right side and may be erected.

However, when the bracket 22 is forced to be slid to the right side in a state in which the upper housing 14 is mounted on the bracket 22, the rotational torque of the hinge main body 34 is released by the torque variable structure 24 and thus, there is a possibility that the upper housing 14 is not easily held stably.

Figure 9A:
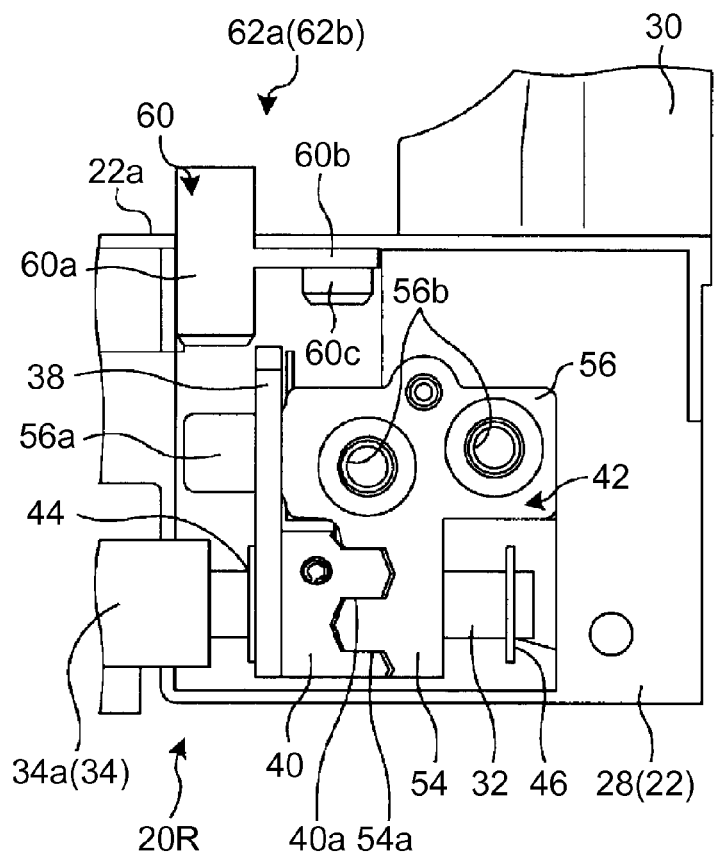
FIGS. 9A and 9B are front views in which some parts of the right side hinge and a switch member which is arranged adjacent to the right side hinge are omitted.
Figure 9B:
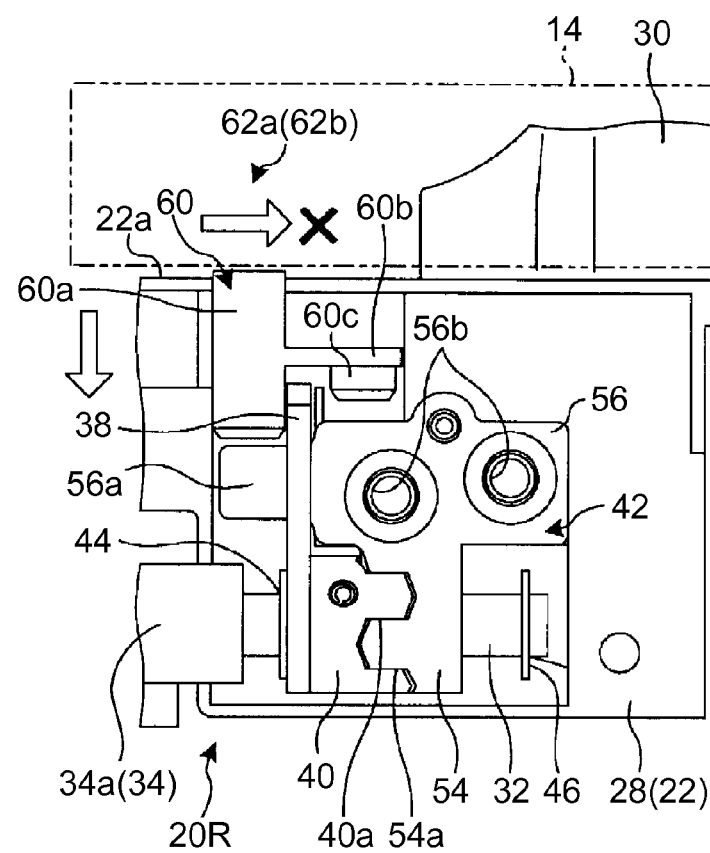

As illustrated in FIGS. 9A and 9B, a switch member 60 may be provided with respect to the torque variable structure 24.

The switch member 60 is an approximately T-shaped member, including a support 60a which is biased upward by a return spring (not illustrated), a horizontal arm 60b which protrudes outward (leftward) from the right side surface of the support 60a, and a protrusion 60c which protrudes downward from a tip end of the horizontal arm 60b in some degree, as seen from the front.

The switch member 60 is attached so as to be vertically movable to the inner surface of the base plate 28 in the bracket 22 in a position in which the right side surface of the support 60a is close to the left side surface of the link arm 38 in the hinge 20R. The switch member 60 is biased upward by the coil spring (compression spring) (not illustrated) and the like, and when the upper housing 14 is mounted on the bracket 22, the switch member is pushed down and moved downward against the biasing force of the coil spring. In FIGS. 9A and 9B, the protrusion piece 38d of the link arm 38 and the coil spring 50 are omitted but the protrusion piece 38d and the coil spring 50 are appropriately provided in a position such as the rear surface side of the switch member 60 so as to avoid the switch member 60.

As illustrated in FIG. 9A, when the upper housing 14 is detached from the bracket 22, the switch member 60 is in a position in which the support 60a protrudes more upward than the attached and detached surface 22a of the bracket 22 and the lower end of the support 60a is positioned more upward than the upper end of the link arm 38. Therefore, the bracket 22 is slid to the right side and the torque variable structure 24 is operated so that the rotational torque of the hinges 20L and 20R can be released.

On the other hand, as illustrated in FIG. 9B, when the upper housing 14 is mounted on the bracket 22, the switch member 60 is pushed down by the upper housing 14, and the lower end of the support 60a is positioned on the left side of the link arm 38. Accordingly, even when the bracket 22 is attempted to be slid to the right side, the support 60a abuts on the link arm 38 and the sliding of the bracket 22 is inhibited. Therefore, the torque variable structure 24 is operated and the rotational torque of the hinge 20 is prevented from being released.

In this manner, while the switch member 60 allows the bracket 22 to be slid in a state in which the upper housing 14 is detached from the bracket 22, the switch member prevents the bracket 22 from sliding in a state in which the upper housing 14 is mounted on the bracket 22. Therefore, a change in the rotational torque with respect to the bracket 22 at the hinge 20, that is, whether or not the clutch mechanism is switched is controlled.

In other words, the switch member 60 functions as a torque reduction inhibiting mechanism (torque change inhibiting mechanism) 62a in which the rotational torque of the hinge main body 34 is changed by regulating the sliding of the bracket 22 in a state in which the upper housing 14 is mounted on the bracket 22, and that is, which inhibits the rotational torque from being reduced (released). With the torque reduction inhibiting mechanism 62a, the rotational torque of the hinge main body 34 is released in the state in which the upper housing 14 is mounted on the bracket 22, and it is possible to prevent the upper housing 14 from being unstable. Thus, the bracket 22 is capable of holding the upper housing 14 in a stable state at all times. In addition, when the upper housing 14 is detached from the bracket 22 as illustrated in FIG. 9A, inhibition of reduction (inhibition of change) in the rotational torque at the hinge 20 is released in the torque reduction inhibiting mechanism 62a. Therefore, the bracket 22 is easily rotated alone.

Figure 10:
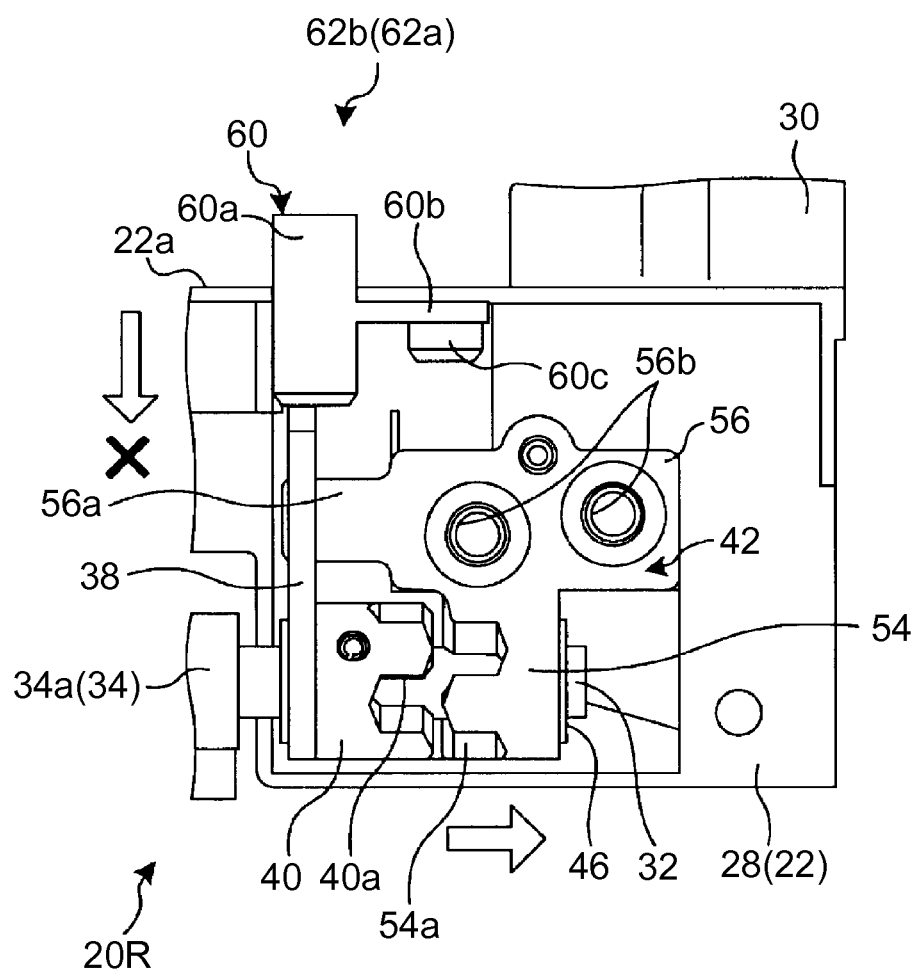
FIG. 10 is a front view in which some parts of the right side hinge and the switch member which is arranged adjacent to the right side hinge are omitted in a state in which the bracket is set to a slide position while the upper housing is not mounted.

Further, as illustrated in FIG. 10, when the switch member 60 is in a position in which the bracket 22 is slid to the right side in a state in which the upper housing 14 is detached from the bracket 22, the lower end of the support 60a is arranged on the upper side of the link arm 38. In this manner, in the state in which the bracket 22 is in the slide position and the torque variable structure 24 is operated to release the rotational torque of the hinge main body 34, if the upper housing 14 is attempted to be mounted on the bracket 22, the lower end of the support 60a abuts on the upper end surface of the link arm 38. Therefore, the switch member 60 cannot be pushed down and thus, the upper housing 14 is prevented from being mounted. As described above, the switch member 60 functions as a mounting inhibiting mechanism 62b which inhibits the upper housing 14 from being mounted on the bracket 22 in the state in which the bracket 22 is slid to release the rotational torque, and erroneous mounting of the upper housing 14 can be prevented in the state in which the rotational torque of the hinge main body 34 is released. Accordingly, it is possible to prevent the upper housing 14 from being unstably mounted on the bracket 22 in the state in which the rotational torque is released.

As described above, the electronic apparatus 10 according to the embodiment includes the upper housing 14 having the display 12, and the lower housing 18 which is rotatably connected with the bracket 22 from which the upper housing 14 is detachable by the hinge 20. The upper housing 14 is openable and closable with respect to the lower housing 18 by rotating the bracket 22 on which the upper housing 14 is mounted, and the torque variable structure 24 which changes rotational torque of the bracket 22 at the hinge 20 is provided. The torque variable structure 24 is capable of reducing the rotational torque of the bracket 22 at the hinge 20 in a state in which the upper housing 14 is detached from the bracket 22, rather than a state in which the upper housing 14 is mounted on the bracket 22.

In this manner, according to the electronic apparatus 10, the torque variable structure 24 is provided which is capable of reducing the rotational torque of the bracket 22 at the hinge 20 in a state in which the upper housing 14 is detached from the bracket 22, rather than a state in which the upper housing 14 is mounted on the bracket 22. Therefore, the bracket 22 from which the upper housing 14 is detached is easily rotated by reducing rotational torque in a state in which the upper housing 14 is detached from lower housing 18, and the shape of the lower housing 18 can be changed into a compact shape. Thus, the electronic apparatus can be easily stored and carried. In addition, since a large rotational torque is maintained in a state in which the upper housing 14 is mounted on the lower housing 18, the upper housing 14 can be stably held at a predetermined angular position.

In addition, the electronic apparatus 10 according to the embodiment includes the upper housing 14 having the display 12, and the lower housing 18 which is rotatably connected with the bracket 22 from which the upper housing 14 is detachable by the hinge 20. The upper housing 14 is openable and closable with respect to the lower housing 18 by rotating the bracket 22 on which the upper housing 14 is mounted, and the torque variable structure 24 which changes rotational torque of the bracket 22 at the hinge 20 is provided. The torque variable structure 24 has the torque change inhibiting mechanism 62a which inhibits rotational torque at the hinge 20 from being changed in a state in which the upper housing 14 is mounted on the bracket 22.

As described above, according to the electronic apparatus 10, the torque change inhibiting mechanism 62a is provided which inhibits rotational torque at the hinge 20 from being changed in a state in which the upper housing 14 is mounted on the bracket 22. Therefore, even when the upper housing 14 is detachable from the lower housing 18, and further, rotational torque at the hinge 20 is changeable, a change in the rotational torque of the hinge main body 34 can be inhibited in the state in which the upper housing 14 is mounted on the bracket 22, and thus, the upper housing 14 can be stably held with respect to the lower housing 18 at all times. Further, since the torque variable structure 24 is provided, for example, the rotational torque of the bracket 22 is reduced in a state in which the upper housing 14 is detached from the lower housing 18, and the bracket 22 from which the upper housing 14 is easily rotated so that the shape of the lower housing 18 can be changed into a compact shape.

The embodiments are not limited to the above-described example embodiment and it is noted that modifications can be freely made within a range not departing the spirit of the present invention.

For example, in the above-described embodiment, the clutch mechanism which switches an engaged state and disengaged state of the shaft side engaging portion 40a and the bracket side engaging portion 54a in conjunction with the sliding of the bracket 22 is illustrated as the torque variable structure 24. However, it is needless to say that other structures may be adopted as the torque variable structure as long as rotational torque at the hinge 20 is changeable based on a state in which the upper housing 14 is mounted on the bracket 22, and for example, an electromagnetic clutch mechanism may be adopted.

In addition, in the embodiment, while there has been a description of the switch member 60 that is moved by the upper housing 14 to switch whether or not the bracket 22 slides, for example, instead of such a switch member 60, a switch member such as a press-button that is exposed to the surface of the bracket 22 or the lower housing 18 and the like may be provided and operated to switch whether or not the bracket 22 slides and whether or not the upper housing 14 is mounted.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An electronic apparatus, comprising:
   a first housing having a display;
   a second housing rotatably connected with a bracket from which the first housing is detachable; and
   a torque variable structure having a first rotational torque of the bracket at a hinge if a first housing is detached from the second housing and which changes the rotational torque of the bracket at the hinge if the first housing is attached to the second housing.

2. The electronic apparatus of claim 1, wherein the first housing is openable and closable with respect to the second housing by rotating the bracket on which the first housing is mounted.

3. The electronic apparatus of claim 2, wherein the torque variable structure reduces the rotational torque of the bracket at the hinge in a state in which the first housing is detached from the bracket, rather than a state in which the first housing is mounted on the bracket.

4. The electronic apparatus according of claim 1,
   wherein the torque variable structure has a torque reduction inhibiting mechanism inhibiting the rotational torque from being reduced in a state in which the first housing is mounted on the bracket.

5. The electronic apparatus according to claim 1, wherein the torque variable structure has a housing mounting inhibiting mechanism inhibiting the first housing from being mounted on the bracket in a state in which the first housing is detached from the bracket and the rotational torque is reduced.

6. The electronic apparatus of claim 1, further comprising a shaft and a clutch mechanism;
   wherein the torque variable structure includes the shaft which is supported on a connection between the first housing and the second housing, the shaft being supported with a predetermined rotational torque, and the clutch mechanism switches a rotating force transmitted from the bracket to the shaft.

7. The electronic apparatus of claim 6, wherein the bracket is slidable in a direction of the shaft, and the clutch mechanism has a shaft side engaging portion which is fixed not to be rotatable around the shaft and a bracket side engaging portion which is slid together with the bracket to be engageable with the shaft side engaging portion.

8. The electronic apparatus of claim 7, further comprising:
   an elastic member that biases the bracket in a direction in which the bracket side engaging portion is engaged with the shaft side engaging portion.

9. An electronic apparatus, comprising:
   a first housing having a display;
   a second housing which is rotatably connected with a bracket from which the first housing is detachable by a hinge; and
   a torque variable structure which changes rotational torque of the bracket at the hinge,
   wherein the first housing is openable and closable with respect to the second housing by rotating the bracket on which the first housing is mounted, and the torque variable structure has a torque change inhibiting mechanism which inhibits the rotational torque from being changed in a state in which the first housing is mounted on the bracket.

10. The electronic apparatus of claim 9, wherein the torque change inhibiting mechanism releases the change inhibition of the rotational torque in a case where the first housing is detached from the bracket.

11. The electronic apparatus of claim 9, wherein the torque variable structure reduces the rotational torque in a state in which the first housing is detached from the bracket, rather than a state in which the first housing is mounted on the bracket.

12. The electronic apparatus of claim 9, wherein the torque variable structure has a hinge shaft which is supported on the hinge with a predetermined rotational torque and a clutch mechanism which switches whether a rotating force is transmitted from the bracket to the hinge shaft.

13. The electronic apparatus of claim 12, wherein the bracket is slidable in a shaft direction of the hinge shaft, the clutch mechanism has a shaft side engaging portion which is fixed not to be rotatable around the hinge shaft, and a bracket side engaging portion which is slid together with the bracket to be engageable with the shaft side engaging portion, and
   the torque change inhibiting mechanism has a stopper member which prevents the bracket from sliding in a state in which the first housing is mounted on the bracket while allowing the bracket to be slid in a state in which the first housing is detached from the bracket.

14. The electronic apparatus of claim 13, wherein the stopper member prevents the first housing from being mounted on the bracket in a state in which the first housing is detached from the bracket, and the bracket is slid to a position where the shaft side engaging portion and the bracket side engaging portion are disengaged from each other.

15. The electronic apparatus of claim 9, wherein the second housing has a keyboard, and
   the first housing is a tablet personal computer operable in a state in which the first housing is separated from the second housing.

* * * * *